United States Patent [19]

Shafer

[11] 4,265,447

[45] May 5, 1981

[54] CAR TRAY AND EXERCISING APPARATUS

[76] Inventor: Bernice A. Shafer, 700 W. Predmore, Lake Orion, Mich. 48035

[21] Appl. No.: 3,005

[22] Filed: Jan. 12, 1979

[51] Int. Cl.³ .................... A63B 23/04; A47B 37/00
[52] U.S. Cl. .................................. 272/73; 108/44; 272/132; 272/900; 272/DIG. 4; 297/163
[58] Field of Search ............... 272/73, 128, 131, 132, 272/400, DIG. 3, DIG. 4, DIG. 5; 108/44; 297/163; D21/194

[56] References Cited

U.S. PATENT DOCUMENTS

| D. 211,478 | 6/1968 | Margolies | D21/194 |
|---|---|---|---|
| 1,189,835 | 7/1916 | Labadie et al. | 297/163 |
| 1,403,317 | 1/1922 | Gross | 108/44 |
| 2,783,044 | 2/1957 | Sbarra | 272/132 |
| 3,309,084 | 3/1967 | Simmons | 272/73 |
| 3,554,139 | 1/1971 | Rosner | 108/44 |
| 3,704,886 | 12/1972 | Kay | 272/73 |
| 3,722,882 | 3/1973 | Patrick | 272/73 |
| 3,910,571 | 10/1975 | Stenn | 272/73 X |
| 4,060,241 | 11/1977 | Hegel | 272/DIG. 3 X |

FOREIGN PATENT DOCUMENTS

| 1435830 | 3/1966 | France | 272/73 |
|---|---|---|---|
| 461839 | 10/1968 | Switzerland | 272/73 |

Primary Examiner—Richard C. Pinkham
Assistant Examiner—Arnold W. Kramer
Attorney, Agent, or Firm—Basile, Weintraub & Hanlon

[57] ABSTRACT

A car tray and exercising apparatus for passengers riding in a vehicle is disclosed. The apparatus comprises a tray deployed in a horizontal plane which is supported by a vertical support. The vertical support comprises a pair of rods having an upper end bent in an arcuate manner to form a hook passing over the back of the front seat of the vehicle. The vertical support has a lower end which rests on the vehicle floor. An exercise axle and wheel is rotatably supported by a bore passing through the lower end of the vertical support. The axle has at each end a pair of radial arms extending in opposed directions, each arm is bent at its end at a right angle to project outward from the wheel forming a pedal. A person seated in the rear seat of the vehicle is able to rotate the wheel using the pedals and obtain exercise thereby.

4 Claims, 3 Drawing Figures

4,265,447

CAR TRAY AND EXERCISING APPARATUS

BACKGROUND OF THE INVENTION

I. Field of the Invention

The present invention relates to the field of vehicle mounted trays, and more particularly to the field of vehicle mounted trays having an exercising apparatus attached thereto.

II. Prior Art Statement

Trays for use in vehicles and particularly trays attached to vehicle seats are well known. U.S. Pat. Nos. 3,335,679; 3,625,161; and 3,804,031 cover vehicle trays for use in automotive vehicles which are vehicle supported. Exercise devices are also old in the art. U.S. Pat. Nos. 3,821,951; and 3,942,971 disclose foot exercisers. U.S. Pat. No. 1,059,172 discloses an exercise device contained in a cabinet which surrounds the person using the device. A hand and foot operated mechanism is operated by the person using the machine to induce perspiration. Vapor and electrical potential are used in combination to treat the user for disease. U.S. Pat. No. 1,059,172 is not configured to be vehicle mounted.

The above listed U.S. Patents constitute the closest art known to the Applicant and his Attorney relating to the present invention. None of the above cited U.S. Patents disclose a vehicle supported tray combined with an exercise device as disclosed in the present invention.

SUMMARY OF THE INVENTION

The present invention comprises a tray deployed in a horizontal plane within a vehicle. The tray is supported by a vertical support means, with the lower end of the vertical support means resting on the vehicle floor. The exercising apparatus comprises an exercise wheel supported by an axle passing through a bore in the lower end of the vertical support means. A pair of radial arms are attached to each end of the axle, the arms extending in opposite directions. Each arm is bent at its end at a right angle to project outward from the wheel to form a pedal.

The upper end of the upper support member curves forward in an arcuate manner to form a hook to engage the top of a front seat of the vehicle, supporting the upper end of the support thereby. The lower end of the upper support is hollow to telescopingly receive the upper end of a lower support member. A threaded aperture is disposed near the lower end of the upper support member to threadingly receive a hand rotatable threaded fastener for attaching the telescoped upper end of the lower support member to the lower end of the upper support member. The lower support member extends downward and inward to meet the axle and then it extends downward and outward a distance to meet the vehicle floor. The lower end of a lower support member extends horizontally outward a distance along the floor to provide a support surface.

A friction wheel is mounted to the lower support member and has a bore closely surrounding a friction wheel axle to provide friction when the wheel is rotated. An adjustment means is provided for varying the friction between the friction wheel axle and the friction wheel.

An odometer-speedometer is rotatably attached to the axle with an indicating means attached to the upper support member.

Other advantages and applications of the present invention will become apparent to those skilled in the field to which this invention pertains when the accompanying description of the best modes contemplated for practicing the invention are read in conjunction with the accompanying drawings.

BRIEF DESCRIPTION OF THE DRAWINGS

In the drawing, like reference numbers refer to like parts throughout the several views, and wherein.

DESCRIPTION OF THE PREFERRED EMBODIMENT

Figure 1:
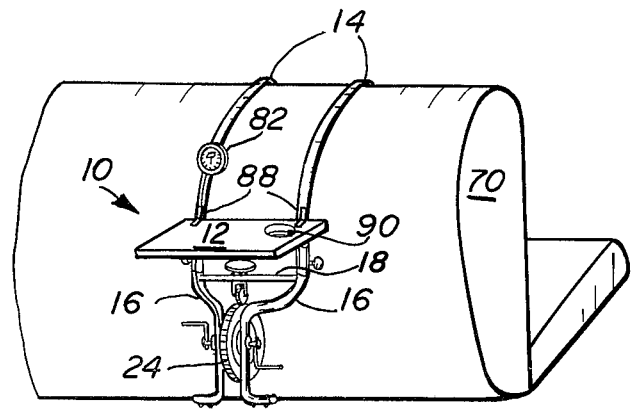
FIG. 1 illustrates a perspective view of the preferred embodiment of the present invention.
Figure 2:
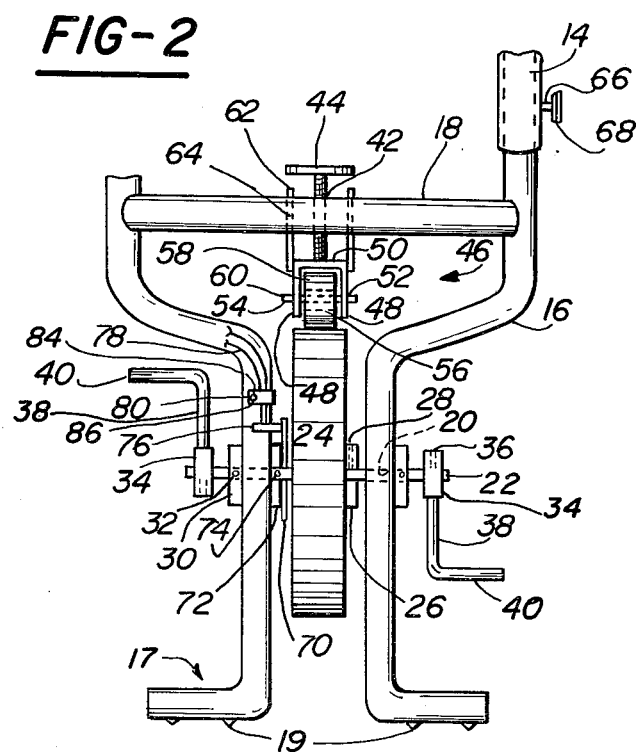
FIG. 2 illustrates a rear view of the present invention facing forward.
Figure 3:
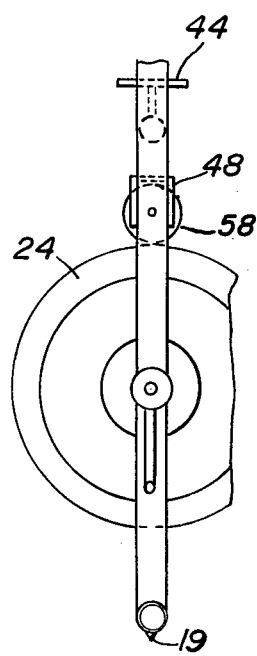
FIG. 3 illustrates a side view of the exercise wheel of the present invention.

Referring now to the drawings and in particular to FIGS. 1, 2 and 3 wherein there is illustrated at 10 a preferred embodiment of the present invention comprising a tray 12 supported by a pair of upper vertical support members 14 and a pair of lower vertical support members 16. The lower vertical support members 16 are held apart in a spaced apart relationship by a cross bar 18 affixed at each end to the lower vertical support members 16 by welding or other suitable means. A horizontal bore 20 passing through the lower vertical support members 16 supports an axle 22. The axle 22 supports a wheel 24 which is attached to the axle by means of a concentrically disposed hub 26 projecting from a side of the wheel 24. A set screw 28 threadingly engages a threaded bore in the hub 26, and tightening of the set screw 28 affixes the wheel 24 to the axle 22. A pair of collars 30 have a central bore which slidingly engages the shaft 22. A radial threaded bore in the collar threadingly engages a set screw 32 which when tightened affixes the pair of collars 30 to the shaft 22 and prevents lateral motion of the shaft 22 while allowing rotational motion to occur.

A pair of collars 34 slidingly engage the shaft 22 at its ends. A threaded bore in each collar 34 threadingly receives set screw 36 which when tightened against the axle 22 affix the collars 34 to the axle 22. Each collar 34 has affixed thereto, and extending radially outward therefrom, a rod 38 which extends outward a distance and then is bent at 90 degrees to face outward from the wheel 24 to form a pedal 40. The rods 38 are affixed to the collars 34 by welding or other suitable means.

The cross bar 18 has at its center a vertical threaded aperture 42 threaded therethrough. A hand rotatable threaded rod 44 is threaded into the aperture 42 and rests against a friction wheel support member 46. The friction wheel support member 46 comprises a pair of vertical legs 48 spaced apart and joined to a top member 50. A pair of aligned apertures 52 passing through the legs 48 support a friction wheel axle 54 which rotatably supports a friction bushing 56. A friction wheel 58 has a concentric bore into which is pressed the friction bushing 56 affixing the friction bushing 56 to the friction wheel 58. A pair of friction retaining washers 60 are pressed over the ends of the shaft 54 to retain the shaft in place. A pair of aligning rods 62 are affixed to the vertical legs 48 by welding or similar means. The rods 62 pass through a pair of aligned apertures 64 in the cross bar 18. The rods 62 cooperating with the apertures 64 in the cross bar 18 hold the friction wheel 58 in a position vertically above the wheel 24. Tightening of the hand rotatable threaded rod 44 loads the friction wheel 58 against the wheel 24, with the amount of load determining the amount of torque generated by the contact between the friction bushing 56 and the axle 54. The amount which the threaded rod 44 is tightened directly determines the amount of effort required to rotate the wheel 24 with the pedals 40.

The lower support members 16 are telescopingly engageable into the hollow portion of the upper support member 14. A threaded aperture 66 near the bottom end of the upper vertical support member 14 threadingly receives a hand rotatable threaded fastener 68. Tightening of the hand rotatable threaded fastener 68 secures the lower support member 16 to the upper support member 14. When the hooks of the upper end of the upper support member 14 have been secured over the top of a seat 71 of the automobile, the hand rotatable threaded fasteners 68 are loosened allowing the lower support members 16 to slide in the hollow portion of the upper support members 14 until the horizontally projecting portions 17 of the lower support members 16 contact the floor of the vehicle. A plurality of points 19 engage the floor mat of the vehicle. The points 19 engaging the floor mat give longitudinal support to the lower support member 16. When the lower support member 16 has been secured against the floor of the vehicle, the hand rotatable threaded fasteners 68 are tightened to hold the lower support member 16 in fixed relationship to the upper support member 14.

A speedometer-odometer gear 70 is affixed to the axle 22 by means of a concentric collar 72 attached to the gear 70. The collar 72 has a bore at its center which slidingly receives the diameter of the axle 22 and a set screw 74 threadingly engages a threaded aperture in the collar 72, and tightening of the set screw 74 affixes the gear 70 to the axle 22 so that the gear 70 will rotate with the axle 22. A pick-up gear 76 affixed to the end of a flexible shaft is aligned to mesh with the teeth of the gear 70, so that when the gear 70 rotates, the gear 76, and hence the flexible shaft, are rotated. The flexible shaft is surrounded by a sheath 78 which protects the flexible shaft. The sheath 78 and the flexible shaft extend upward to engage the speedometer-odometer indicating means or gauge 82 which is mounted on the upper vertical support member 14. A mounting clip 80 surrounds the sheath 78 and extends to the side of the sheath 78 having an aperture 84 passing therethrough. A threaded fastener 86 passes through the aperture 84 engaging a threaded aperture (not shown) in the lower support member 16 to mount the sheath 78 and the gear 76 in engagement with the gear 70.

A pair of hinges 88 affixed at the one end to the upper support members 14 and at the other end to the tray 12 are configured to mount the tray 12 in a first or horizontal position, and in a second or vertical position. An aperture 90 in a corner of the tray 12 has a diameter configured to snugly retain the outside of a cup (not shown) and hold the cup securely in position.

Having thus described my invention what I claim is:

1. A car tray and exercising apparatus for a vehicle comprising:
    a vertical support means, said support means having a lower end resting on the vehicle floor;
    an exercise wheel supported by an axle passing through the vertical support means, the axle having at each end a pair of radial arms, an arm for each axle end extending in opposed directions, each arm at its end is bent at a right angle projecting outward from the wheel to form a pedal, and wherein said vertical support means comprises:
    two upper support members each with an upper end curving forward in an arcuate manner forming a hook to engage the top of a front seat of the vehicle, the lower end of each of the upper support members telescopingly mating with a respective lower support member, means for adjustably attaching the telescoped members;
    the lower support members extending downward and inward to meet the axle, then downward with the lower end of the lower support members including floor engaging means; and
    a bore through the lower support members to rotatably support the axle;
    a tray rotatably supported by the upper support members, said tray being rotatable between a horizontal and a vertical position.

2. The tray and exercise apparatus as defined in claim 1 further comprising:
    a friction wheel axle mounted to the vertical support means;
    a friction wheel with a bore closely surrounding the friction wheel axle; and
    the friction wheel engageable with the exercise wheel.

3. The tray and exercise apparatus as defined in claim 2 further comprising:
    an adjustment means for varying the friction between the axle and the friction wheel.

4. The tray and exercise apparatus as defined in claim 1 further comprising:
    an odometer-speedometer rotatably attached to the axle with an indicating means attached to the support means.